US008434768B2

(12) United States Patent
Schug et al.

(10) Patent No.: US 8,434,768 B2
(45) Date of Patent: May 7, 2013

(54) STUD-HOLDING DEVICE FOR STUDS HAVING LARGE FLANGE HEADS

(75) Inventors: Alexander Schug, Giessen (DE); Rolf-Dieter Graf, Giessen (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/307,034

(22) Filed: Nov. 30, 2011

(65) Prior Publication Data
US 2012/0139193 A1  Jun. 7, 2012

Related U.S. Application Data

(63) Continuation of application No. PCT/EP2010/057650, filed on Jun. 1, 2010.

(30) Foreign Application Priority Data

Jun. 2, 2009 (DE) .......................... 10 2009 023 454

(51) Int. Cl.
*B23B 31/20* (2006.01)
*B23K 9/20* (2006.01)

(52) U.S. Cl.
USPC ............................. 279/43.2; 279/46.3; 219/98

(58) Field of Classification Search ................. 279/20.1, 279/43.2, 46.3; 219/98, 99; *B23B 31/20; B23K 9/20*
See application file for complete search history.

(56) References Cited

U.S. PATENT DOCUMENTS

| | | | | |
|---|---|---|---|---|
| 1,958,828 A * | 5/1934 | Guy | ............................. | 279/20.1 |
| 2,341,744 A * | 2/1944 | Sheffer | ......................... | 279/20.1 |
| 2,745,933 A * | 5/1956 | Puckett | ............................ | 219/98 |
| 3,119,008 A * | 1/1964 | Pomeroy et al. | ................. | 219/98 |
| 3,723,700 A * | 3/1973 | Ettinger | .......................... | 219/98 |
| 3,774,005 A * | 11/1973 | Spisak | ............................. | 219/98 |
| 3,792,223 A * | 2/1974 | Spisak | ............................. | 219/98 |
| 4,415,792 A * | 11/1983 | Jordan | ............................. | 219/98 |
| 4,620,079 A * | 10/1986 | Allmann et al. | ................. | 219/98 |
| 4,669,742 A | 6/1987 | Broszukat | | |
| 5,688,414 A * | 11/1997 | Kondo | ............................. | 219/98 |
| 5,798,494 A * | 8/1998 | Aoyama et al. | .................. | 219/98 |
| 6,015,962 A * | 1/2000 | Wiessler et al. | ................. | 219/98 |
| 6,362,448 B1 * | 3/2002 | Roser | ............................. | 219/99 |
| 6,559,406 B2 * | 5/2003 | Stepetic et al. | .................. | 219/98 |

(Continued)

FOREIGN PATENT DOCUMENTS

| | | |
|---|---|---|
| DE | 3218886 A1 * | 11/1983 |
| DE | 34 14 430 C1 | 6/1985 |
| DE | 296 17 208 U1 | 1/1997 |
| DE | 101 57 183 C1 | 2/2003 |

*Primary Examiner* — Eric A Gates
(74) *Attorney, Agent, or Firm* — Harness, Dickey & Pierce, P.L.C.

(57) ABSTRACT

The present invention relates to a holding device for studs having a radially projecting flange section. The holding device comprises a collet component having a clamping section and a hollow insertion section. The clamping section is formed by clamping surfaces which are provided at the free ends of a plurality of clamping arms designed to exert a radially inwardly directed clamping force for clamping the stud in place. A securing device is arranged on the insertion section and is designed in such a way that a flange section of a stud directed past the securing device is mounted in a securing position between the securing device and the clamping section. The clamping arms are of the same length and at least two of the clamping arms each have, as a securing device, a radially inwardly directed securing lug.

6 Claims, 4 Drawing Sheets

U.S. PATENT DOCUMENTS

| | | | |
|---|---|---|---|
| 6,838,634 B2 * | 1/2005 | Obermann | 219/98 |
| 6,998,564 B2 * | 2/2006 | Papke et al. | 219/98 |
| 7,053,331 B2 * | 5/2006 | Citrich et al. | 219/98 |
| 7,071,440 B2 * | 7/2006 | Sakoda | 219/98 |
| 7,129,437 B2 * | 10/2006 | Madsak et al. | 219/99 |
| 7,262,383 B2 | 8/2007 | Mauer | |
| 7,339,133 B2 * | 3/2008 | Citrich et al. | 219/98 |
| 7,521,646 B2 * | 4/2009 | Schlafhauser et al. | 219/98 |
| 8,110,773 B2 * | 2/2012 | Hobson et al. | 219/98 |
| 8,258,422 B2 * | 9/2012 | Hobson et al. | 219/98 |
| 2011/0146456 A1 * | 6/2011 | Hain et al. | 81/55 |

* cited by examiner

STUD-HOLDING DEVICE FOR STUDS HAVING LARGE FLANGE HEADS

CROSS REFERENCE TO RELATED APPLICATIONS

The present application is a continuation of International PCT application No. PCT/EP2010/057650, filed Jun. 1, 2010, designating the U.S., which claims priority to German application No. 10 2009 023 454.3, filed Jun. 2, 2009, and published in the German language. The entire contents of these priority applications are incorporated herein by reference.

BACKGROUND OF THE INVENTION

The present invention relates to a holding device for studs which have a radially projecting flange section, comprising a collet component which has a clamping section and a hollow insertion section, wherein a stud can be inserted via the insertion section to the clamping section, wherein the clamping section is formed by clamping surfaces which are provided at the free ends of a plurality of clamping arms and which are designed in order to exert a radially inwardly directed clamping force for clamping the stud in place, and wherein a securing device, past which a flange section of the stud can be directed, is arranged on the insertion section and is designed with respect to the clamping section in such a way that a flange section which is directed past the securing device is mounted in a secured manner in a securing position between the securing device and the clamping section.

Such a holding device is known from document DE 296 17 208 U1.

The present invention also relates to a shank-clamping device which can be inserted into a holding device for studs and is designed in order to accommodate a shank section of a stud by means of a shank-locating section and in order to shift the stud from a securing position into a ready position.

Furthermore, the present invention relates to a joining head for joining studs to workpieces, comprising a holding device according to the invention and a shank-clamping device according to the invention, and also relates to a method of feeding a stud to a joining head.

In the field of joining technology, it is known to join studs to the surface of a workpiece. This includes so-called "stud welding", in which a stud is welded to the surface of a workpiece. Alternative joining techniques include, for example, the adhesive bonding of a stud to the surface of a workpiece.

Such processes are frequently carried out in an automated manner, for example in the motor vehicle industry, where a multiplicity of such studs are joined to the vehicle sheet in order to provide anchors for fastening means, panelling, etc. The automated joining of studs to workpieces as a rule includes the provision of a joining head on a robot. The joining head is in this case connected to a supply unit which provides, for example, the electric welding current and other control signals. Furthermore, it is preferred to feed the studs to the joining head in an automated manner. As a rule, this is effected by means of compressed air through feed tubes. For high cycle times, it is appropriate in this case to feed the studs from the rear, as it were, into a holding device of the joining head. The holding device serves to shift the stud into a defined ready position, starting from which a joining process can be initiated.

The diameter of the feed passages is as a rule slightly larger than the diameter of the flange section in order to make it possible to transport the stud therein with an easy motion. In the holding device, too, the inside diameter of the insertion section is as a rule slightly larger than the outside diameter of the flange section. This may result in a stud fed to the holding device coming into an oblique position in the holding direction and first having to be oriented (centered) again with a welding axis before the stud can be transferred into the ready position. In some situations, it may be the case that this centering does not succeed, the result of which is that the fed stud then has to be ejected from the holding device. In the process, the stud falls downwards in an uncontrolled manner, either onto the floor or also, for example in automobile construction, into the body. The ejected studs then lie distributed on the floor and are swept up and thrown away. Studs left lying in a body may subsequently lead to disturbing noises during driving.

The aim of document DE 296 17 208 U1 is to provide a stud holder in which a stud can be located in a precise position. To this end, a stud holder is proposed which has a plurality of elastic arms which form a first holder. Furthermore, a number of arms are designed to be shorter than the other arms and thus form a second holder. If a flange section of a stud passes this second, holder, it can be fixed between the first and the second holders. In particular, this is intended to provide better centering of the stud.

However, in the case of such holding devices having arms of different length, a situation may occur in which weld or molten pool spatter or contaminants enter the stud holder during the welding operation through the gaps between the arms. In particular cooled weld spatter can be cleaned from the stud holder only with difficulty, and therefore it is often necessary to exchange the stud holder after a certain time. Furthermore, due to weld or molten pool spatter, the stud holder and the loading pin insert can be welded to one another and the loading pin can no longer be displaced, which may lead to a system failure.

SUMMARY OF THE INVENTION

The object of the present invention is therefore to provide a stud holder which can be used in particular in applications having a high degree of weld spatter and contaminants and in addition enables the stud to be located in a precise position.

This object is achieved in the case of the holding device mentioned at the beginning in that the clamping arms are of the same length and at least two of the clamping arms each have, as securing device, a radially inwardly directed securing lug.

Due to the clamping arms being designed to be the same length, the clamping surfaces of the clamping arms form an essentially cylindrical clamping collar, wherein the clamping surfaces, in a ready position, bear all the way round in one plane against a stud to be held or fed. There are certainly still gaps between the individual clamping arms, due to the slots provided for providing radial elasticity of the clamping arms. However, these gaps can virtually be disregarded compared with the gaps between clamping arms of different length which are to be found in the prior art.

However, on account of the same length of all the clamping arms, no second holder—as known from the prior art—can be provided by means of the clamping surfaces at the free ends of the clamping arms.

For this reason, at least two clamping arms, but preferably all the clamping arms, of the holding device according to the present invention have securing lugs which are directed radially inwards. In this case, the securing lugs lie in a plane oriented transversely to the feed direction, such that the internal cross section of the collet component of the holding device is reduced in this plane.

The narrowed internal cross section in the plane of the securing lugs is larger than the internal cross section in the plane of the clamping surfaces but smaller than the internal diameter of the insertion section, such that a securing space of large cross section is provided in the axial direction between the clamping surfaces and the securing lugs, in which securing space the flange section of a stud can be positioned.

During the loading of a stud, said stud is first of all conveyed with a feed device, for example by means of compressed air, into the collet component and rests on the securing lugs. During the charging of a stud by means of a shank-clamping device of a loading pin, the lugs therefore first of all form a bearing surface, such that a counterforce acts at this point. This already helps to slip the shank section of a stud into the shank-clamping device. If the shank section of a stud is then pushed past the securing lugs into the securing space, with the clamping arms expanding radially, the flange section of the stud can be arranged in the securing space only in a manner made possible by the axial distance between the securing lugs and the clamping surfaces. Accordingly, the securing lugs are at a distance from the clamping surfaces in the axial direction only to such an extent that an end of the shank section of a stud remote from the flange cannot come to bear against an inner wall of the clamping aims.

The holding device according to the invention therefore enables a stud to be located in a precise position and securely slipped in, the susceptibility to contaminants being substantially reduced.

Furthermore, the centering means of a shank-clamping device is assigned to the holding device, which centering means can be inserted from above into the insertion section and into the securing device and is designed in order to orient or centre or take hold of a shank section of the stud.

The provision of the securing device in the form of radially inwardly directed securing lugs can ensure that the centering means can always effectively take hold of or orient or centre the stud. Consequently, studs do not have to be needlessly ejected and no troublesome noises occur, for example, in a vehicle body. Contamination in the production cell is also avoided. A cost saving is also achieved, since ejected studs generally have to be discarded.

The expression "secure mounting" of the flange section is intended in this case to mean that the stud cannot fall back through the insertion section (in particular if the holding device is held "overhead") and/or that the stud is secured against an extreme oblique position inside the holding device. It is therefore possible, using the holding device according to the invention, to also reliably feed so-called "large-flange studs" having a comparatively short shank.

Furthermore, the above object is achieved according to the invention in that a shank-clamping device is provided which can be inserted into a holding device according to the invention for studs and is designed in order to accommodate a shank section of a stud in a securing position by means of a shank-locating section and in order to shift the stud from a securing position into a ready position and is characterized in that a groove, preferably a circumferential groove, is provided radially on the outside on the shank-locating section.

The shank-clamping device according to the invention interacts with the holding devices according to the invention and has in particular a circumferential groove on the outer surface of the shank-locating section, said groove corresponding in its shape and size to the securing lugs of the holding device. The circumferential groove is designed in particular in such a way that the securing lugs of the clamping arms can come to lie freely in it. The expression "freely" should be understood to the effect that the securing lugs are arranged inside the groove but do not touch the ground of the groove.

If the shank-clamping device is directed past the securing lugs, the latter first of all exert a radially inwardly directed force on the outer surface of the shank-clamping device, or rather of a shank-centering section. The shank of the stud is therefore already clamped in place in the shank-clamping device before the clamping surfaces of the clamping arms take over this function. This prevents the stud from falling out when the flange section of the stud is pushed past the clamping surfaces and the clamping surfaces therefore still cannot act on the outer surface of the shank-centering section.

In the charged state, i.e. when the clamping surfaces of the clamping arms bear against the outer surface of the shank-centering section and clamp the stud, the securing lugs rest freely in the circumferential groove and no longer apply any force. The shank-clamping device is then merely clamped by the clamping surfaces, a welding current then being directed into the stud through the latter during a joining operation. Any shunt passing through the securing lugs and the shank of the stud is thus reliably avoided.

Furthermore, the object is achieved according to the invention by a method of feeding a stud to a joining head which serves to join the stud to a workpiece, wherein the stud has a radially projecting flange section, comprising the steps of feeding the stud into a holding device of the joining head until the flange section is arranged in front of a clamping section, formed from clamping arms of the same length, of the holding device and reaches a securing position, and of securing the stud in the securing position by a securing device engaging behind the flange section, which securing device is formed from radially inwardly directed securing lugs of the clamping arms.

Finally, the above object is achieved by a joining head for joining studs to workpieces, comprising a holding device according to the invention and/or comprising a shank-clamping device according to the invention.

The object is therefore completely achieved.

In a preferred embodiment of the holding device according to the invention, a respective securing lug and the corresponding clamping arm are formed in one piece. Such a production operation can be carried out by means of known turning and milling tools and enables the collet component to be provided in one piece. As a result, the holding device has fewer individual parts, which in principle makes it simpler to assemble.

Alternatively, provision may be made for the respective securing lug to be a separate component and for it to be fixed to the corresponding clamping arm, for example by a suitable fastening means.

Provision may of course also be made for the securing lug to be connected to corresponding clamping arms by means of adhesive bonding or other, for example integral, processes. In this way, it is possible to form the securing lug from a different material from the respective clamping arm. This may be necessary, for example, in order to provide the securing lug with desired material-dependent elasticity or a certain frictional resistance.

Provision can preferably be made for a transition from the respective securing lug to the insertion section to be formed continuously or uniformly. This makes it possible to convey the flange section of the stud past the securing lugs as far as possible without wear. The maximum counterforce that can be applied in the axial direction by the securing lugs can be set depending on the radius with which such a continuous transition is formed. Furthermore, the force which is to be applied in the axial direction by the shank-clamping device in order to expand the clamping arms of the collet component can thus be set.

In the case of the shank-clamping device according to the invention, provision is made in a preferred embodiment for a plurality of radially elastic arms to be provided which narrow at their respective free end in such a way that they form an insertion cone with a bevel of 60° to 80°, said insertion cone forming a centering section.

Such an angle of the bevels of the insertion cone permits an especially reliable slip-in behavior of the centering section.

In the method according to the invention, provision is made in a preferred embodiment for the stud to be taken hold of and centered in the securing position by a shank-clamping device before the shank-clamping device is inserted into the clamping section in order to shift the stud into a ready position.

In this way, a stud is prevented from being pushed through the clamping surfaces without being oriented in a centered manner and therefore from being pushed through before the shank-clamping device can exert a clamping force on the shank section of the stud.

In a further preferred embodiment, the securing lugs of the clamping arms, in the ready position, come to lie in a circumferential groove on the outer surface of the shank-locating section.

As already explained above, only the clamping surfaces of the clamping arms then exert a radially inwardly directed clamping force on the outer surface of the shank-locating section and clamp the stud in place. The welding current to be introduced is then applied through the clamping surfaces during the welding operation. The securing lugs lying freely in the groove therefore have no contact with the shank-clamping device, such that no shunt can occur.

It goes without saying that the abovementioned features and the features still to be explained below can be used not only in the respectively specified combination but rather also in other combinations or on their own without departing from the scope of the present invention.

BRIEF DESCRIPTION OF THE DRAWINGS

Exemplary embodiments of the invention are shown in the drawing and are described in more detail below. In the drawing.

DETAILED DESCRIPTION OF THE PREFERRED EMBODIMENT

Figure 1:
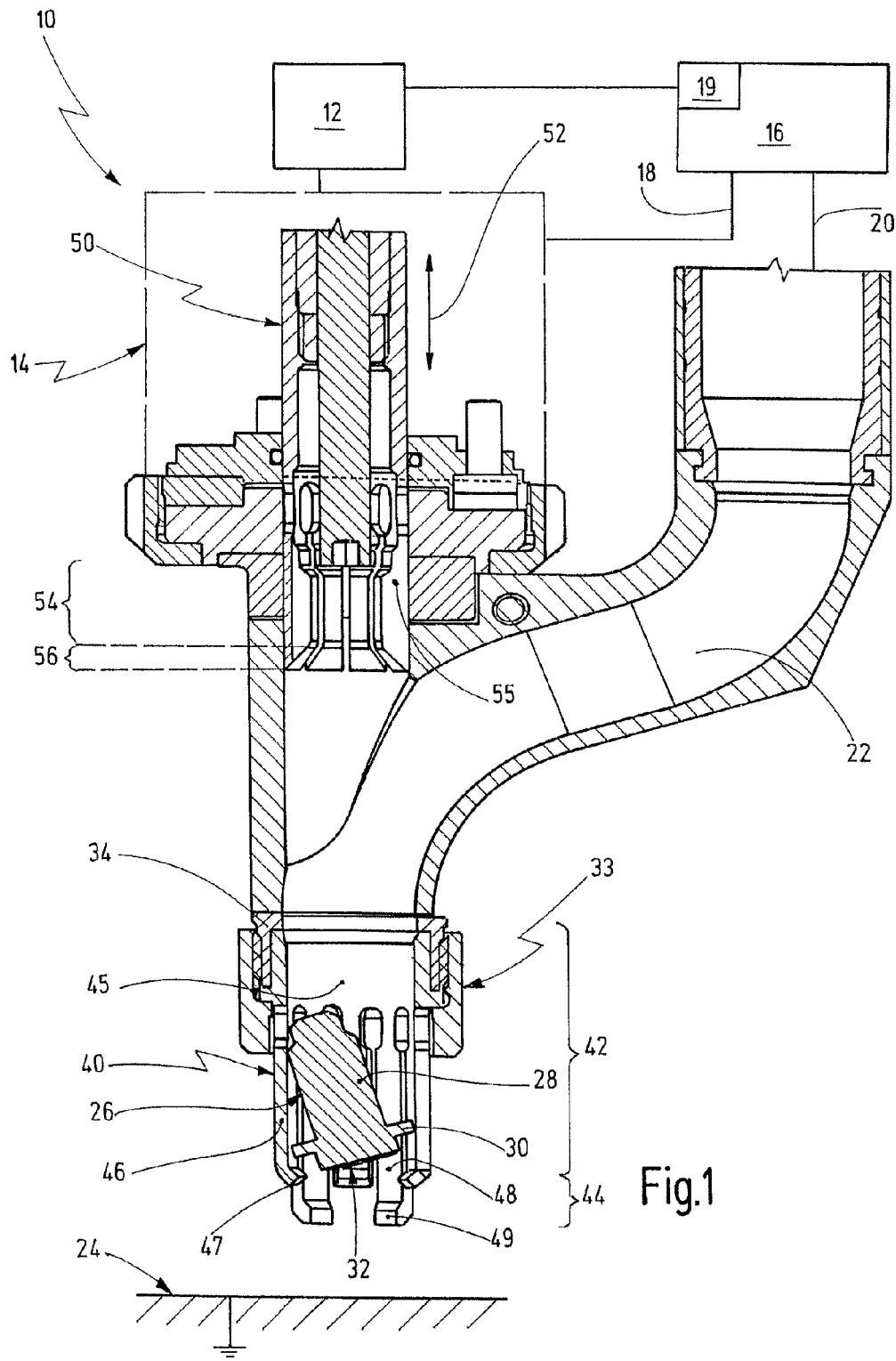
FIG. 1 shows a schematic illustration of a joining system having a holding device and a shank-clamping device according to the prior art.

A joining system in the form of a stud welding system is designated generally by 10 in FIG. 1. The welding system 10 contains a robot 12, which may be designed, for example, as a robot having multi jointed arms. A welding head 14 is fixed to an end of a processing arm of the robot 12. The welding head 14 is connected to a supply unit 16 via an electrical supply 18 and via a stud feed 20. The supply unit 16 typically contains power electronics for providing a welding current which is fed to the welding head 14. Furthermore, the supply unit 16 typically contains a control device, by means of which the robot 12 can also be activated, to be precise via a robot control 19. Furthermore, the supply unit 16 contains a stud supply, from which studs are fed in a singulated manner to the stud feed 20.

The welding head 14 contains a feed passage 22 which is connected to the stud feed 20 and via which a respective stud 26 can be directed into the welding head 14. The stud 26 fed to the welding head 14 is to be welded to a workpiece 24, for example a metal sheet, by means of the welding system 10. In the present case, the welding system 10 is designed as a stud welding system which can work, for example, according to the drawn arc method. In this method, the stud 26 is first of all put onto the workpiece 24 by means of the welding head 14. A pilot current is then directed through the stud 26 and the workpiece 24. After that, the stud 26 is lifted slightly from the workpiece 24, in the course of which an arc is struck. The current is then increased to a welding current, in the course of which those surfaces of the stud 26 and of the workpiece 24 which are opposite one another are fused. Finally, the stud 26 is lowered again onto the workpiece 24, and the welding current is switched off. The connected molten pools of stud 26 and workpiece 24 solidify, such that the stud 26 is finally fixedly connected to the workpiece 24. Such stud welding systems are widely used in the motor vehicle industry.

Alternatively, however, the joining system 10 may also be designed to adhesively bond or braze the stud 26 to the workpiece 24.

The stud 26 has a shank section 28 which can be provided, for example, with an external thread. Furthermore, the stud 26 has a flange section 30 which projects radially relative to the shank section 28 and may be of polygonal design, for example, at its outer circumference. Finally, the stud 26 has a welding section 32 which is to be connected to the workpiece 24.

The joining head 14 contains a holding device 33 for the stud 26, this holding device 33 serving to shift the stud fed via the feed passage 22 into a ready position, in which the stud 26 has a defined position with respect to the joining head 14 and which the stud 26 assumes before the joining process described above is initiated.

The holding device 33 contains a housing section 34 which is rigidly connected to the joining head 14. Furthermore, the holding device 33 contains a collet component 40 which is formed by an insertion section 42, which is designed as a hollow section and is connected to one end of the feed passage 22, and by a clamping section 44 which is designed to clamp the stud 26 frictionally in the ready position (by inwardly acting radial forces). The collet component 40 has an annular section 45 in the top region of the insertion section 42. The annular section 45 is connected to the feed passage 22. Extending from the opposite end of the annular section 45 are a plurality of circumferentially distributed clamping arms 46, on the end of which respective clamping surfaces 47 are formed, said clamping surfaces 47 extending radially inwards at an angle.

Furthermore, a plurality of stop arms 48 extend from the annular section 45. The stop arms 48 are generally longer than the clamping arms 46 and are provided at their ends with stop lugs 49 which are directed radially inwards. The stop arms 48 and the clamping arms 46 are arranged alternately, for example, over the circumference of the holding device. The stop arms 48 not only perform the function of a limit stop, as described below, but also a clamping function. The stop arms 48 therefore also form second clamping arms.

The clamping arms 46 and the stop arms 48 can be elastically expanded in the radial direction. A stud 26 fed into the holding device 33 is shown in FIG. 1, which stud 26 has been fed from above via the stud feed 20 and the feed passage 22 through the insertion section 42. The stud 26 in this case is shown in a marked oblique position, which generally cannot be avoided with this type of holding device 33. This is due to the fact that the flange section 30 inside the insertion section 42 comes into contact with the inner side of the clamping arms 46 or of the stop arms 48. The fact that the outer circumference of the flange section 30 is often of polygonal design and/or the fact that longitudinal grooves are formed between the arms 46, 48 can result in such an oblique position.

Furthermore, a shank-clamping device 50, which is formed on the joining head 14 such as to be movable in the axial direction, as shown at 52, is assigned to the holding device. The shank-clamping device 50 has a shank-locating section 54 which contains a plurality of radially expandable arms 55 extending in the axial direction. Furthermore, the shank-clamping device 50 has a centering section 56. The centering section 56 is formed on the ends of the arms 55 of the shank-locating section 54, the arms 55 in the region of the centering section running obliquely outwards, such that they jointly form an insertion cone 57.

To shift the stud 26 into a ready position, the shank-clamping device 50 is moved downwards (the specification "downwards" relates to the illustration in FIG. 1 but should not be understood as being restrictive), to be precise into the holding device 33. In the process, the centering section 56 takes hold of the top end of the shank section 28 and sets the stud 26 upright, the shank section 28 being inserted into the shank-locating section 54 until a top end of the shank section 28 strikes a limit stop of the shank-clamping device 50.

The shank-clamping device 50 is then moved further downward, the flange section 30 first of all being pushed past the clamping surfaces 47. In the process, the clamping arms 46 expand radially outwards. The stop lugs 49 of the stop arms 48 prevent the stud 26 from subsequently falling out of the holding device 33 by virtue of the fact that the stop lugs 49 act on the underside of the flange section 30. Proceeding therefrom, the shank-clamping device 50 is moved further downwards, the clamping lugs 47 acting on the outer circumference of the shank-clamping device 50 and thereby clamping the stud 26 fixedly in the shank-clamping device 50.

The shank-clamping device 50 is then moved still further downward until the flange section 30 is also pushed past the stop lugs 49. A ready position is reached when the flange section 30 lies slightly below the bottom end of the stop lugs 49. A radial force continues to be exerted on the shank-clamping device 50 in this state by the clamping arms 46 and the stop arms 48, such that the stud 26 is held or clamped frictionally in this position in the holding device 33. Proceeding therefrom, the joining process described above can be initiated. When the stud 26 is rigidly joined to the workpiece 24, the joining head 14 is retracted (in which case the shank-clamping device 50 can first of all be moved back inside the joining head 14). As a result, the stud 26 is released from the holding device 33. A further stud 26 can then be fed via the feed passage 22 and a further joining process can be initiated.

The stud feed can be realized in a largely reliable manner by the double clamping system set up in this way. In particular in applications in a dirty environment or during welding operations, however, a situation may occur in which dirt or a splashing weld pool passes through the gaps formed between the free ends of the clamping arms 46 and the stop arms 48 into the holding device 33 and contaminates the latter. In this case, in particular the cooled molten pool may impair the operability of the holding device 33 and necessitate an exchange.

Figure 2:
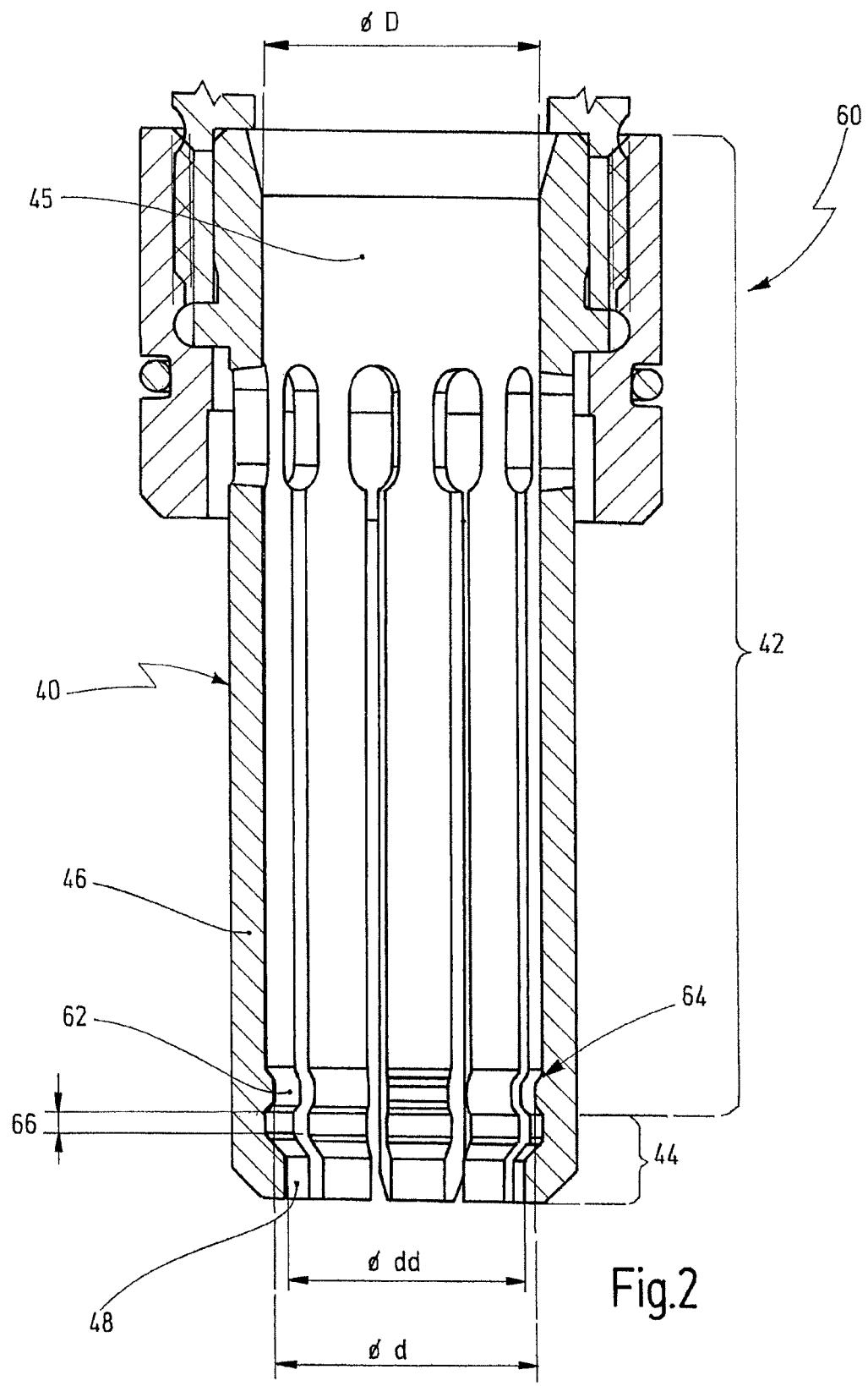
FIG. 2 shows a cross-sectional view of a holding device according to the invention in a preferred embodiment.
Figure 3:
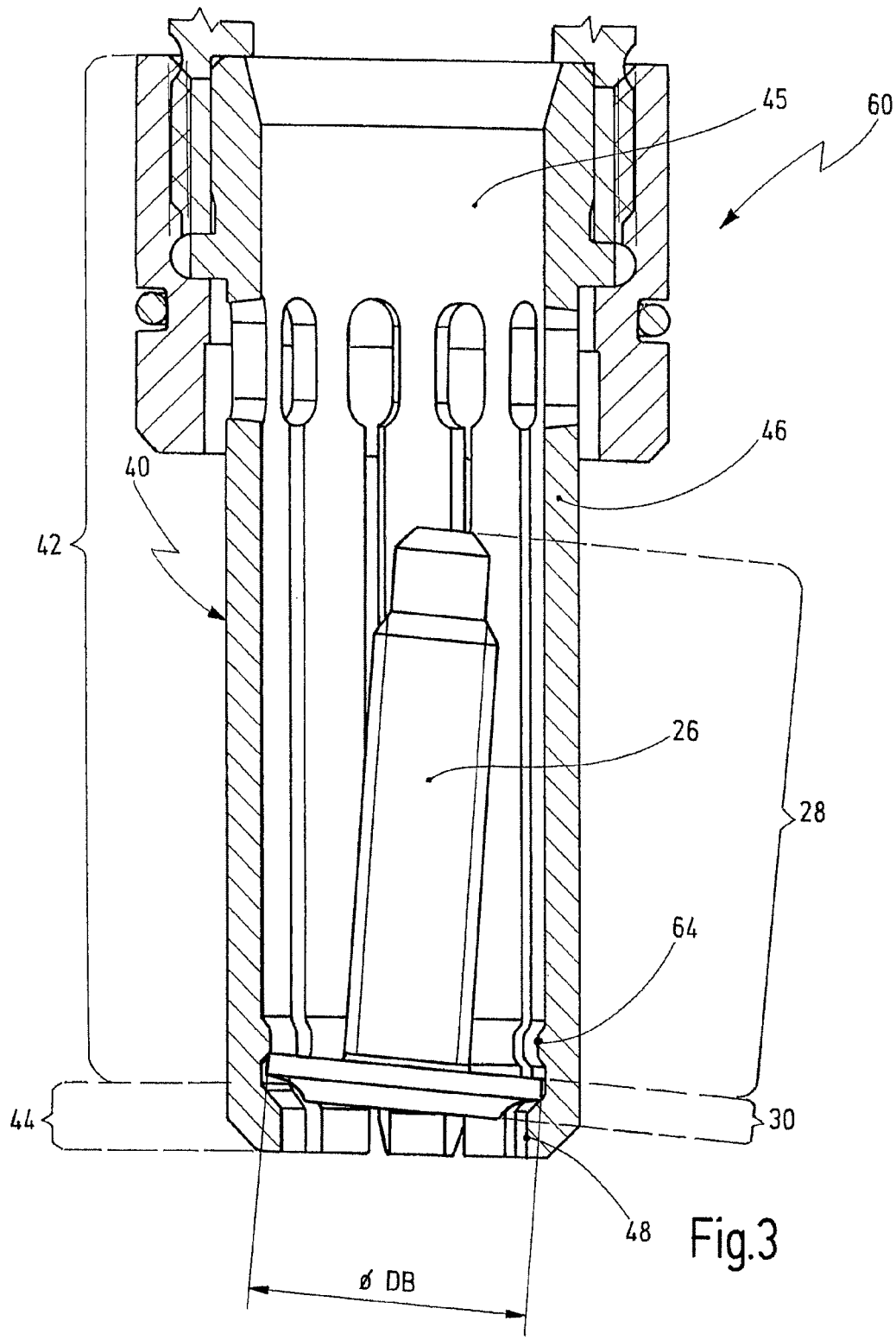
FIG. 3 shows a cross-sectional view of the holding device in FIG. 2 with a stud located in a securing position.

A holding device 60 according to the invention with which these problems can be reduced is shown in FIGS. 2 and 3.

With regard to its functioning, the holding device 60 shown in FIGS. 2 and 3 generally corresponds to the holding device 33 of FIG. 1. The same elements are therefore designated by the same designations. Only the differences are dealt with below. Furthermore, the joining head 14 on which the holding device 60 of FIGS. 1 and 2 is to be used corresponds to the joining head 14 of FIG. 1. The general method sequence during the feeding and readying of studs 26 and the subsequent joining sequence are also otherwise identical, in so far as nothing else is mentioned.

The holding device 60 likewise has a collet component 40, which is rigidly connected to the housing section 34 of the joining head 14.

The collet component 40 is divided into the clamping section 44 and the insertion section 42. The insertion section 42 is slightly widened conically in the direction of the feed passage 22 so that the stud 26 can pass with an easy motion into the insertion section 42.

The insertion section 42 is formed from a plurality of radially elastic clamping arms 46 which all have the same length. The inner surfaces of the clamping arms 46 enclose an inside diameter D. In the insertion section 42, in particular at that end of the insertion section 42 which merges into the clamping section 44, each clamping arm 46 has a securing lug 62, which in the embodiment shown is formed in one piece with the clamping arm 46. The securing lugs 62 each extend radially inwards, such that they enclose an inside diameter d. The inside diameter d is smaller than the inside diameter D.

The transition from the inside diameter D to the inside diameter d is formed continuously with a radius 64.

The clamping section 44 adjoins the securing lugs 62. In the clamping section 44 there are clamping surfaces 48 which project radially inwards at an axial distance from the securing lugs 62.

Between the securing lugs 62 and the clamping surfaces 48, the inside diameter again widens to the diameter D, such that a securing space 66 is provided. The clamping surfaces 48 of the clamping arms 46 enclose an inside diameter dd. The inside diameter dd is smaller than the inside diameter d and smaller than the inside diameter D.

Shown in FIG. 3 is a stud 26, the flange section 30 of which is arranged in the securing space 66. The collet component 40 corresponds to the collet component 40 in FIG. 2. As can be seen, the axial distance between the securing lugs 62 and the clamping surfaces 48 and thus the axial width of the securing space 66 are selected in such a way that the shank section 28 of the stud 26 cannot come to bear against the clamping arms 46. In this way it is possible, at the latest when the flange section 30 has been pushed past the securing lugs 62 into the securing space 66, for an insertion cone of a shank-clamping device 50 to securely slip in the shank section 28 of the stud 26 and for said insertion cone to therefore orient the stud 26 concentrically to a joining axis and with a longitudinal axis of the stud 26 parallel to the joining axis. A diameter DB of the flange section 30 of the stud 26 is slightly smaller than the inside diameter D, such that the stud 26 can pass into the collet component 40. However, the diameter DB of the stud 26 is larger than the diameter d and larger than the diameter dd. The flange section 30 of the stud 26 can therefore be securely mounted in the securing space 66 without the stud 26 being able to fall downwards out of the collet component 40 or being able to slip upwards back into the insertion section 42. In this case, the specifications "downwards" and "upwards" refer to the orientation which can be seen in FIG. 3.

The stud 26 can either be brought into the securing position, for example, by means of air pressure, wherein the securing lugs 62 and the radius 64 are then to be designed in such a way that force exerted by the air pressure is sufficient in order to expand the clamping arms 46 to such an extent that the flange section 30 can enter the securing space 66 past the securing lugs 62. It may also be possible in principle for the flange section 30 of the stud 26 to be pushed past the securing lugs 62 during the charging of the stud 26 by the shank-clamping device 50. In this case, the stud 26, should the shank section 28 have come to bear against a clamping arm 46, is lined up somewhat when the flange section 30 passes into the securing space 66 and the securing lugs 62 engage behind the flange section 30, such that the collet component 40 can grip the stud 26.

Figure 4:
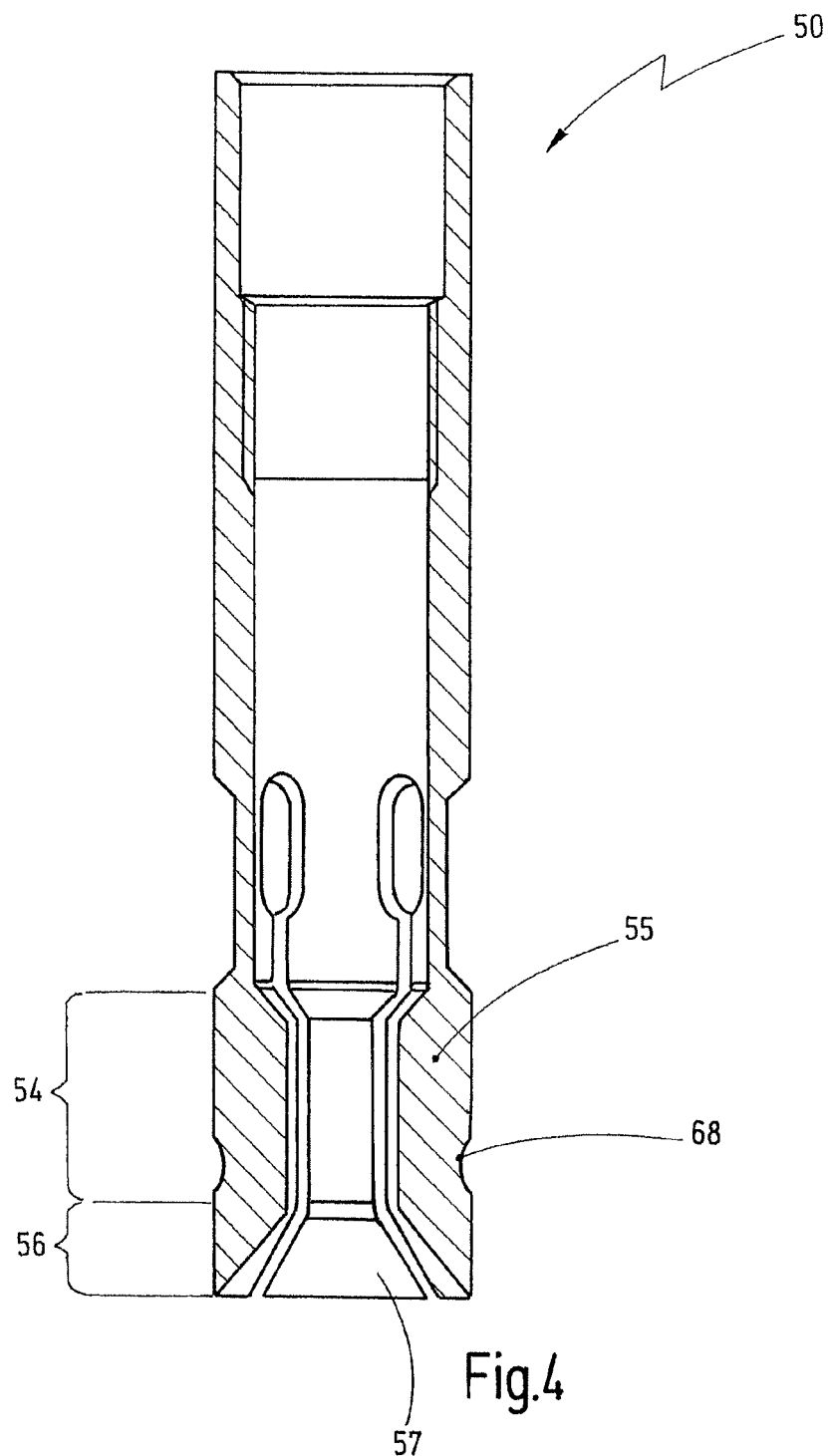
FIG. 4 shows a cross-sectional view of a shank-clamping device according to the invention in a preferred embodiment for interacting with the holding device in FIG. 2.

FIG. 4 shows the shank-clamping device 50 according to the invention, which interacts in a manner according to the invention with the holding device 60 according to the invention. The shank-clamping device 50 in FIG. 4 likewise has the shank-locating section 54 and the centering section 56. The centering section 56 is in this case designed in the form of the insertion cone 57. Furthermore, the shank-clamping device 50 has the plurality of arms 55 which are radially elastic. In this way, a force exerted on the arms 55 radially from outside can be transmitted to a stud 26 located in the shank-clamping device 50 and the stud 26 can be clamped in the shank-clamping device 50.

The arms 55 each have a groove 68. The groove 68 runs around on the outer surface of the arms 55 and corresponds in shape and size to the securing lugs 62 in such a way that the latter can come to lie freely in the grooves 68 without the securing lugs 62 being in contact with the arms 55. Thus, in a charged state, i.e. in a ready position, only the clamping surfaces 48 of the collet component 40 bear against the outer surface of the centering section 56 of the shank-clamping device 50 and press the arms 55 radially inwards, such that a stud 26 is securely clamped in place in the shank-clamping device 50.

In addition, during the charging operation, the securing lugs 62 already exert a radially inwardly directed force on the outer surface of the centering section 56. This prevents the stud 26 from falling out of the holding device 60 in the absence of radially inwardly directed clamping forces when the clamping arms 46 are expanded when the flange section 30 of the stud 26 is pushed through past the clamping surfaces 48.

Accordingly, the position of the grooves 68 is to be selected in such a way that the securing lugs 62 do not come to lie in the grooves 68 until the flange section 30 is pushed past the clamping surfaces 48 and the clamping surfaces 48 act on the outer surface of the centering section 56.

Those skilled in the art will appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The invention claimed is:

1. A stud handling system for studs having a shank and a radially projecting flange, comprising:
  a shank clamping device comprising a radially elastic shank clamping section having an internal bore with a diameter in a static state that is slightly larger than the shank of a stud for securely clamping the shank of a stud when a radially inward directed force is exerted on said shank clamping section; and
  a holding device for receiving a stud and holding it in a secure position for engagement by said shank clamping device, said holding device comprising:
    a collet defining a cylindrical axis and having an insertion section adapted to be connected at an inlet thereof to a feed passage for receiving studs, said collet having an internal passageway with a diameter greater than the radially projecting flange of a stud, and a clamping section comprising a plurality of equal length clamping arms for generating inwardly acting radial clamping forces;
    a first group of said plurality of clamping arms each having an inwardly projecting securing lug located at a first axial distance from said inlet, said inwardly projecting securing lugs defining a first internal diameter (d) that is less than the radially projecting flange of a stud;
    a second group of said plurality of clamping arms each having an inwardly projecting clamping lug located at a second axial distance from said inlet greater than said first axial distance, said inwardly projecting clamping lugs defining a second internal diameter (dd) that is less than the radially projecting flange of a stud;
    each of said plurality of clamping arms having an internal securing groove formed at an axial location between said first and second axial distances, said securing groove defining a diameter (D) greater than the radially projecting flange of a stud;
  wherein a stud entering the insertion section of said collet with its radially projecting flange first and its shank projecting rearwardly therefrom passes into said secure position when the radially projecting flange of the stud is positioned in said securing groove;
  wherein said insertion section is further adapted to receive said shank clamping section of said shank clamping device, said shank claming section having an outer diameter in said static state greater than said first internal diameter (d);
  wherein said shank clamping device is adapted in a charging operation to move axially within said holding device to thereby move said stud from said secure position to a ready position wherein the radially projecting flange of the stud is located below said clamping lugs; and
  further wherein said securing lugs exert a radially inward acting force on the shank clamping section of said shank clamping device causing said shank clamping device to securely clam the shank of the stud during said charging operation.

2. The stud handling system of claim 1, wherein said second internal diameter (dd) is less than said first internal diameter (d).

3. The stud handling system of claim 1, wherein said first group and said second group comprise the same plurality of clamping arms.

4. The stud handling system of claim 3, wherein each of said plurality of clamping arms and its respective securing lug and clamping lug are formed in one piece.

5. The stud handling system of claim 1, wherein said clamping lugs exert a radially inward acting force on the shank clamping section of said shank clamping device causing said shank clamping device to securely clamp the shank of the stud in said ready position.

6. The stud handling system of claim 5, wherein a radial groove is provided on the outside of said shank clamping section of said shank clamping device for freely receiving said securing lugs in said ready position.

* * * * *

UNITED STATES PATENT AND TRADEMARK OFFICE
CERTIFICATE OF CORRECTION

PATENT NO. : 8,434,768 B2  
APPLICATION NO. : 13/307034  
DATED : May 7, 2013  
INVENTOR(S) : Alexander Schug et al.

Page 1 of 1

It is certified that error appears in the above-identified patent and that said Letters Patent is hereby corrected as shown below:

Title Page, Item (73) "Assignee",

"Black & Decker Inc." should be -- Newfrey LLC --.

Title Page, Item (56) "References Cited", U.S. PATENT DOCUMENTS "1,958,828",

"Guy" should be -- Laughlin --.

In the Claims

Column 10,

Line 39 (Claim 1), "claming" should be -- clamping --.

Line 50 (Claim 1), "clam" should be -- clamp --.

Signed and Sealed this  
Third Day of December, 2013

Margaret A. Focarino  
*Commissioner for Patents of the United States Patent and Trademark Office*